United States Patent
Yang et al.

[11] Patent Number: 5,808,750
[45] Date of Patent: Sep. 15, 1998

[54] SYSTEM FOR RECORDING/REPRODUCING BOTH DIGITAL AND ANALOG SIGNALS FOR A VIDEO CASSETTE RECORDER

[75] Inventors: Tae Seok Yang; Young Joon Choi, both of Seoul, Rep. of Korea

[73] Assignee: Goldstar Co. Ltd., Seoul, Rep. of Korea

[21] Appl. No.: 164,729

[22] Filed: Dec. 10, 1993

[30] Foreign Application Priority Data

Dec. 10, 1992 [KR] Rep. of Korea ............... 1992 23874
Apr. 20, 1993 [KR] Rep. of Korea ............... 1993 6635

[51] Int. Cl.⁶ .............................. H04N 5/76; G11B 5/00
[52] U.S. Cl. .............................. 359/335; 360/32
[58] Field of Search ............... 358/335, 310, 358/342; 360/72, 33.1; 348/384

[56] References Cited

U.S. PATENT DOCUMENTS

| 4,963,991 | 10/1990 | Honjo .................................. 358/310 |
| 5,195,073 | 3/1993 | Kato et al. ........................... 369/47 |
| 5,394,275 | 2/1995 | Iketani et al. ....................... 360/35.1 |
| 5,414,566 | 5/1995 | Oba et al. ............................ 360/13 |

FOREIGN PATENT DOCUMENTS

| 0488337 | 6/1992 | European Pat. Off. . |
| 0524715 | 1/1993 | European Pat. Off. . |
| 0598184 | 5/1994 | European Pat. Off. . |
| 3510766 | 9/1986 | Germany . |
| 3-24067 | 9/1982 | Japan . |
| 5207507 | 8/1993 | Japan . |

*Primary Examiner*—Thai Q. Tran
*Assistant Examiner*—Robert Chevalier
*Attorney, Agent, or Firm*—Jacobson, Price, Holman & Stern, PLLC

[57] ABSTRACT

A system for a video cassette recorder is capable of recording/reproducing analog video and audio signals as well as digital video and audio signals for a HDTV.

The revolution of a head drum may be determined different from each other depending on the selected mode, i.e., digital or analog signal recording/reproducing mode, and thus the digital signal having a different recording bandwidth from the analog signal can be recorded on and reproduced from a conventional analog tape.

8 Claims, 5 Drawing Sheets

SYSTEM FOR RECORDING/REPRODUCING BOTH DIGITAL AND ANALOG SIGNALS FOR A VIDEO CASSETTE RECORDER

BACKGROUND OF THE INVENTION

1. Field of the Invention

The present invention generally relates to a recording/reproducing system for a video cassette recorder (VCR), and more particularly to a system for recording/reproducing both digital and analog signals which can record and reproduce the existing analog video and audio signals as well as digital video and audio signals for HDTV (High Definition Television).

2. Description of the Prior Art

A conventional VCR has been designed to record or reproduce either an analog type signal or a digital type signal. Further, in case of a conventional digital VCR, only one HD type digital signal among a plurality of HD type digital signals divided in accordance with their resolution of picture, may be recorded and reproduced.

SUMMARY OF THE INVENTION

It is an object of the present invention to provide a system capable of recording/reproducing analog video and audio signals as well as digital video and audio signals.

It order to achieve the above object, the present invention provides a system for recording/reproducing both digital and analog signals, comprising:

- mode selection control means for providing a plurality of selection control signals for selecting a mode corresponding to an input digital/analog mode selection signal;
- analog/digital converting means for converting input analog video and audio signals into digital signals;
- formatting means for selecting one of an input HDTV digital signal and said digital signal from said analog/digital converting means in accordance with a first selection control signal from said mode selection control means and converting the selected digital signal into a format suitable for recording on a tape;
- record signal processing means for processing the formatted signal from said formatting means in accordance with the characteristic of said tape and providing the processed signal to a record head;
- playback signal processing means for selectively receiving a playback signal reproduced by a playback head in accordance with a second selection control signal and digitally processing said playback signal;
- deformatting means for restoring said digital playback signal from said playback signal processing means to a format suitable for reproduction and selectively converting the restored signal into said HDTV digital signal or said another digital signal in accordance with a third selection control signal from said mode selection control means; and
- digital/analog converting means for converting the deformatted digital signal from said deformatting means into said analog video and audio signals.

It is preferable that the system further comprises head drum revolution control means for controlling the revolution of a head drum in accordance with a fourth selection control signal from said mode selection control means, whereby the revolution of said head drum may be varied depending on the selected mode.

DETAILED DESCRIPTION OF THE PREFERRED EMBODIMENTS

Figure 1:
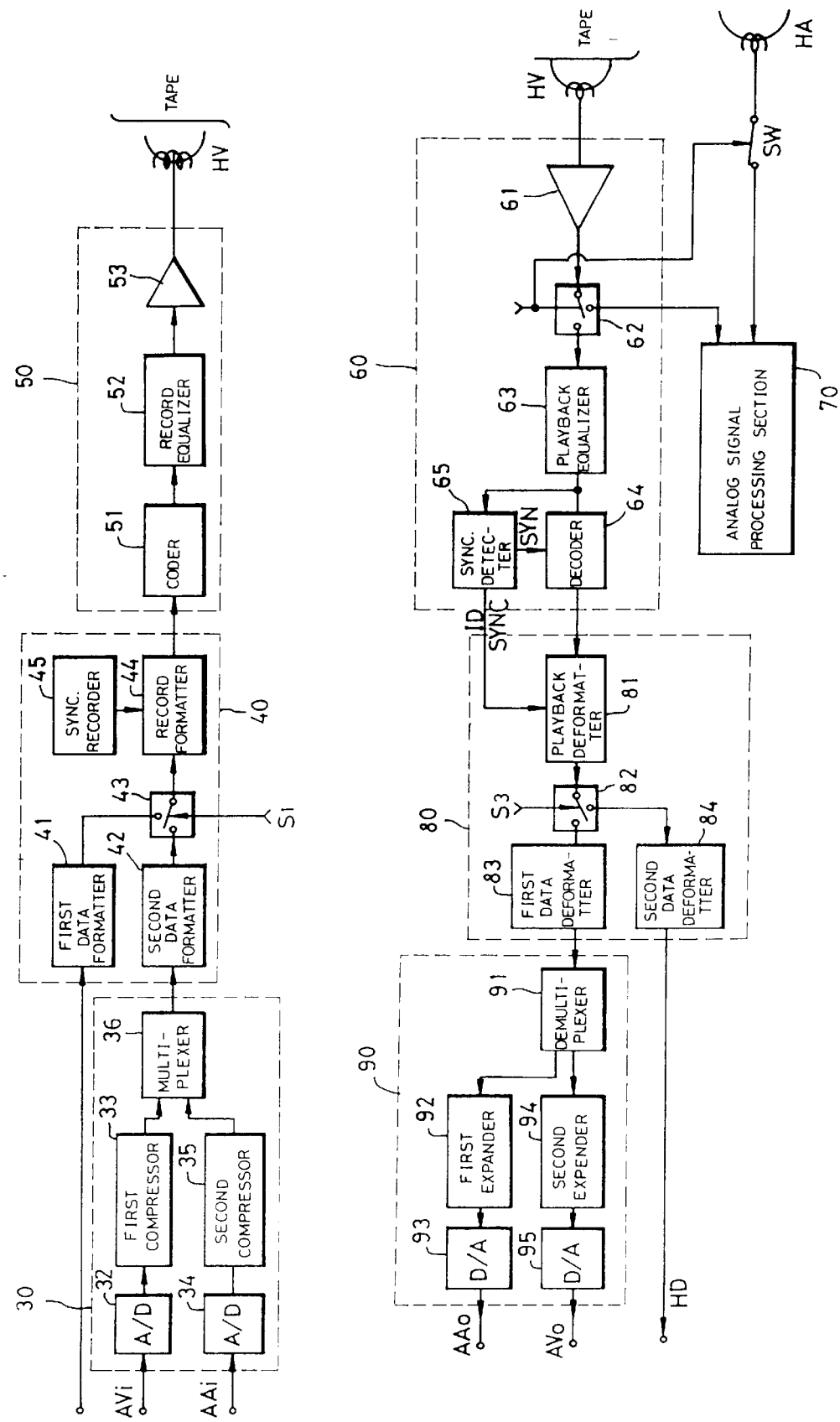
FIG. 1 is a schematic block diagram of one embodiment of the recording/reproducing system according to the present invention.

FIG. 1 is a schematic block diagram of an embodiment of the system for recording/reproducing both digital and analog signals according to the present invention. In the embodiment, an analog/digital (A/D) converting section 30 comprises an A/D converter 32, 34 for quantizing input analog video and audio signals AVi, AAi to digital data, first and second compressors 33, 35 for respectively compressing the outputs of the A/D converter 32, 34 by a bit rate recordable on a video tape, and a multiplexer 36 for multiplexing the outputs of the data compressors 33, 35.

A formatting section 40 comprises a first data formatter 42 performing encoding for-error correction with respect to the output of the multiplexer 36, a second data formatter 41 performing encoding for error correction with respect to an input HDTV digital signal HD, a first switch for seleoting one of the outputs of the data formatters 41, 42 according to a first selection control signal S1 from a mode selection control section 10 (not illustrated in FIG. 1), a sync recorder 45 for adding a sync signal and an identification signal, which are needed in reproducing, to the output data through the first switch 43, and a record formatter 44 for mixing the output signals Syn, ID of the sync recorder 45 into the output data of the first switch 43 and converting it to be recordable on the tape. A record signal processing section 50 comprises a coder 51 for coding the output of the record formatter 44 to be suitable for the channel characteristic of the tape, an equalizer 52 for filtering the output of the colder 51 to be suitable for the channel characteristic of the tape, and a record amplifier 53 for amplifying the output of the equalizer 52 to a predetermined level and recording it on the tape through a head HV.

Meanwhile, a playback signal processing section 60 comprises a playback amplifier 61 for amplifying a signal reproduced through the head HV, a switch 62 for switching the output of the playback amplifier 61 according to the second selection control signal S2 from the mode selection control section 10, an equalizer 63 for compensating the signal distortion and detecting a clock and data with respect to the digital playback signal outputted through the switch 62, a sync detector 65 for detecting and outputting a sync signal, which is a criterion of digital data signal processing, and an identification signal from the output of the equalizer 63, and a decoder 64 for decoding the output of the equalizer 63 according to the outputs Syn, ID of the sync detector 65.

A deformatting section 80 comprises a playback deformatter 81 for converting the output of the decoder 64 into a form suitable for reproducing according to the outputs Syn, ID of the sync detector 65, a switch 82 for switching the output of said playback deformatter 81 according to the third selection control signal S3 form the mode selection control section 10, a data deformatter 84 for converting the output signal through the switch 82 to a digital signal for HDTV, and a data deformatter 83 for converting the output signal through the switch 82 into data suitable for being converted into an analog signal.

A D/A converting section 90 comprises a demultiplexer 91 for demultiplexing the output of the data deformatter 83 and separating it into video and audio data, data expanders 92, 94 for expanding the video and audio data from the demultiplexer 91 to be restored to their original data, and D/A converters 93, 95 for converting the output data of the data expanders 92, 94 into the respective analog signals.

Figure 2:
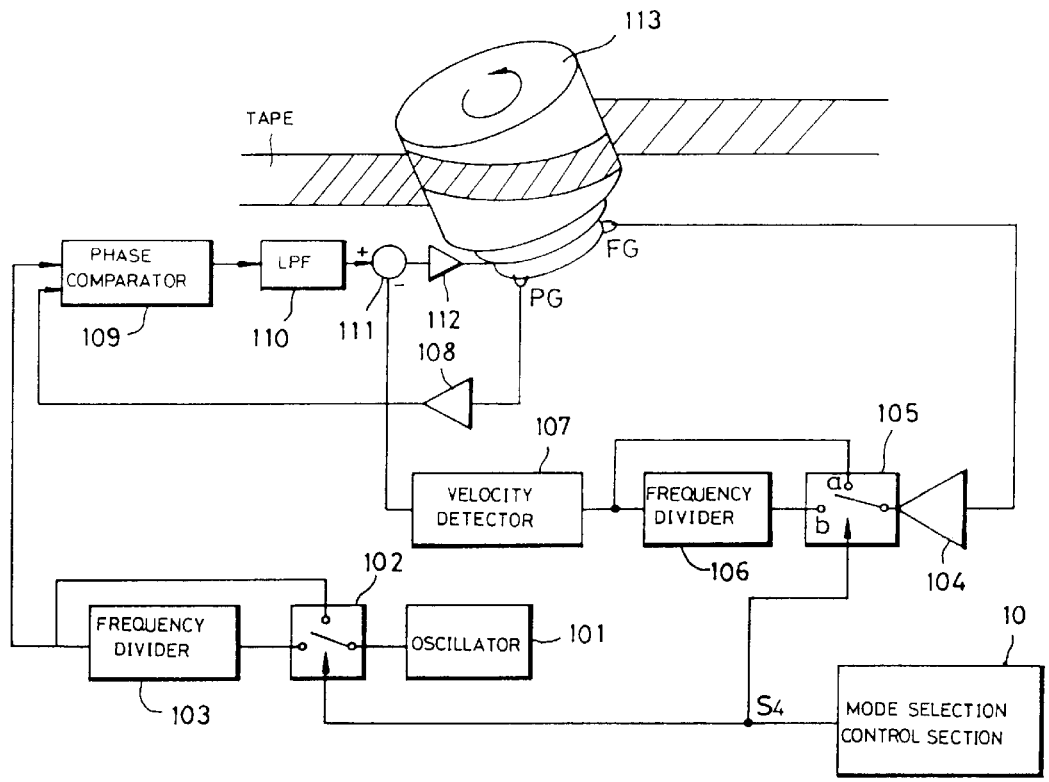
FIG. 2 is a schematic block diagram of a head drum revolution control section incorporated into the system according to the present invention.

FIG. 2 shows the construction of a head drum revolution control section 100 added to the system of the present invention. The head drum revolution control section 100 comprises pre-amplifiers amplifiers 108, 104 for amplifying the detected signals of a pulse generator PC and a frequency generator FG to a predetermined level according to the rotation of a drum 113, switches 102, 105 switching-controlled by the fourth selection control signal from the mode selection control section 10, a frequency divider 106 for dividing by two the output frequency of the pre-amplifier 104 through the switch 105, a velocity detector 107 for receiving the output of the pre-amplifier 104 through the divider 106 or the switch 105 to detect the revolution of the drum 113, a frequency divider 103 for dividing by two the 60 Hz output of an oscillator 101 through the switch 102, a phase comparator 109 for phase-comparating the output of the frequency divider 103 or the output of the scillator 101 through the switch 105 with the output of the pre-amplifier 108, a low pass filter 110 for eliminating the high frequency component from the output of the phase comparator 109, an adder 111 for subtracting the output of the velocity detector 107 from the output of the low pass filter 110, and a drum motor driving amplifier 112 for controlling the rotation velocity of the drum 113 according to the output of the adder 11 inputted thereto.

The operation and the working effect of the recording/reproducing system according to the present invention constructed as described above will be described in detail hereinafter.

First, in case of recording operation, if the A/D converter 32, 34 converts input analog video and audio signal Avi, AAi into digital data, data compressors 33, 35 compress the converted digital data by a recordable bit rate. The compressed digital data, which have a bit rate of about 20 Mbps, are converted into a form which can be processed in the data formatter 42 according as the multiplex 36 selects the outputs of the data compressors 33, 35 at a predetermined interval. Also the HDTV digital signal HD is converted in-to a form which can be processed in the data formatter 41.

In this case, if the switch 43 is switched to the output terminal of the data formatter 41 according to the selection control signal S1 from the mode selection control section 10, the digital signal for HDTV is formatted, while if the switch 43 is switched to the data formatter 42, the A/D-converted digital signal is formatted.

The digital signal selected by the switch 43 as described above is inputted to the record formatter 44, to which a sync signal Syn and an identification signal ID are added, and then the output of the record formatter 44 is inputted to the coder 51 as a signal of a recordable form. The coded signal from the coder 51 is filtered to be suitable for the channel characteristic of the video tape by the equalizer 52, and amplified to a predetermined level through the record amplifier 53, and then recorded in the video tape by the head HV.

The recording speed of this compressed digital data is about 30 Mbps, thereby a record bandwidth of about 15 MHz is required, and in case of the conventional analog signal, a record bandwidth of about 7 MHz is required.

For the recording and reproducing of the signals having different record bandwidths from each other, the head velocities to a tape must be determined differently from each other, and for this the rotation velocities of the head drum must also be determined differently from each other, which will be described later again.

Meanwhile, in case of digital signal reproduction, if the switch 62 comes to be connected to the equalizer 63 and the switch SW comes to be off by the selection control signal S2 from the mode selection control section 10, a digital signal process operation is performed. In this case, the data detected from the video tape by the head HV are amplified to a predetermined level through the playback amplifier 61, a clock and data are detected therefrom and signal distortion is compensated through the equalizer 63. The sync detector 65 detects a sync signal Syn which is a criterion of signal processing, and an identification signal ID from the output of the equalizer 63.

In this case, the decoder 64 decodes the output of the equalizer 63 to the original data according to the output Syn of the sync detector 65, the playback deformatter 81 converts the output of the decoder 64 into a signal suitable for reproducing and outputs the decoded signal to the switch 82. At this time, if the switch 82 is connected to the data deformatter 84 according to the selection control signal S3, the output signal from the deformatter 84 is converted into a digital signal HD for HDTV, and if the switch is connected to the data deformatter 83, the output signal is converted into another digital signal suitable for being converted into an analog signal.

The output of the data deformatter 83 is inputted to the demultiplexer 91 and demultiplexed, so that it is separated into digital video and audio signals, and the separated audio and video signals are restored to their original signals, respectively, through the data expanders 92, 94, and then they are converted into analog audio and video signals AVo, AAo through the respective D/A converters 93, 95.

Meanwhile, in case of reproducing of analog signals, the switch 62 is connected to the analog signal processing section 70 and the switch SW comes to be 'ON' according to the selection control signal S2. Therefore, an analog video signal from the playback amplifier 61 and an analog audio signal achieved by the audio head HA are inputted to and processed by the analog signal processing section 70. This reproducing path is adopted in reproducing a conventional VHS-type tape.

Also, in the present invention, the rotation velocity of the head drum is set for 3600 rpm in recording/reproducing a digital signal, while it is set for 1800 rpm in recording/reproducing an analog signal, thereby the respective bandwidths for both signals are satisfied. That is, by making the relative velocity of the head to the tape to be doubled, the recording bandwidth can be doubled, which is expressed by the following equation.

$$f(\text{MHz}) = V/\lambda$$

where V is the relative velocity of the head to the tape, and λ is the shortest recording wavelength.

Figure 3A:
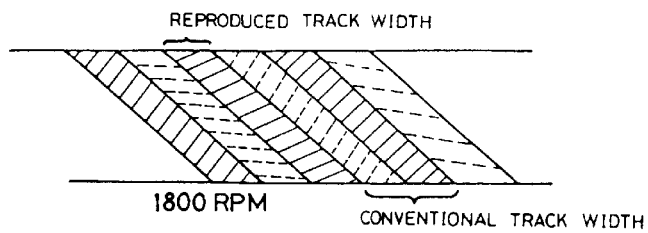
FIGS. 3A and 3B illustrate tape tracks traced by the head in reproducing of analog and digital signals according to the present invention.
Figure 3B:
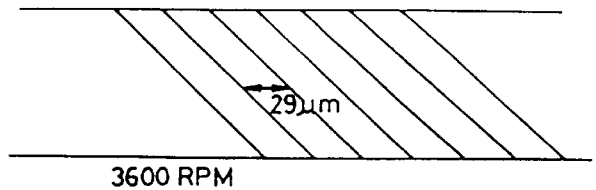

In this case, if the width of the video head gap is set for 29 μm, which is about ½ of the conventional tape track width, to equalize the consuming quantities of the video tape shown in FIGS. 3A and 3B, the reproduction of the conventional analog tape together with recording/reproduction of the digital signal can be possible. That is, in reproducing an analog tape, reproducing is performed on the half of the conventional track, making the reproduced signal level decrease and the signal to noise rate (S/N) become worse, but the good picture quality may be achieved by adding the function of automatic gain control (AGC) or noise reduction.

Meanwhile, the drum velocity must be varied depending on reproduction of a digital signal or an analog signal, which will be described hereinafter referring to FIG. 2.

First, in order to rotate the drum 113 with a velocity of 3600 rpm in recording and reproducing a digital signal, a frequency of 60 Hz outputted from the oscillator 101 is provided as a reference signal.

Meanwhile, in reproducing an analog signal, a frequency of 30 Hz, which is produced by dividing by two the output of said oscillator 101 in the divider 103, is provided as a reference signal to rotate the drum 113 at a velocity of 1800 rpm.

When the reproduction is performed, the states of the respective switches 102, 105 are set according to the selection control signal S4 outputted from the mode selection control section 10. The state of this selection control signal may be set by counting the sync signal in the mode selection control section 10 during a predetermined time.

In reproducing a digital signal, the respective switches 102, 105 are switched to their contacts a, respectively. In this case, according to the rotation of the drum 113, the output of the pulse generator PG is inputted to the phase comparator 109 through the pre-amplifier 108, and then it is phase-compared with the reference signal provided from the oscillator 101 or the frequency divider 103, and the output of said phase comparator 109, is applied to the adder 111 through the low pass filter 110 for eliminating high frequency components.

Also, according to the rotation of the drum 30, the output signal of the frequency generator FG is amplified to a predetermined level by the pre-amplifier 104, and then is inputted to the velocity detector 107 through the switch 105. The contact of this switch 105 is connected to the velocity detector 107 in digital signal reproducing, and to the frequency divider 106 in analog signal reproducing.

The adder 111 subtracts the output of the velocity detector 107 from the output of the phase comparator 109(i.e., through the low pass filter 110), and outputs a signal according to the difference thereof to the drum motor driving amplifier 112, thereby the rotating velocity of the drum 113 is controlled.

Figure 4:
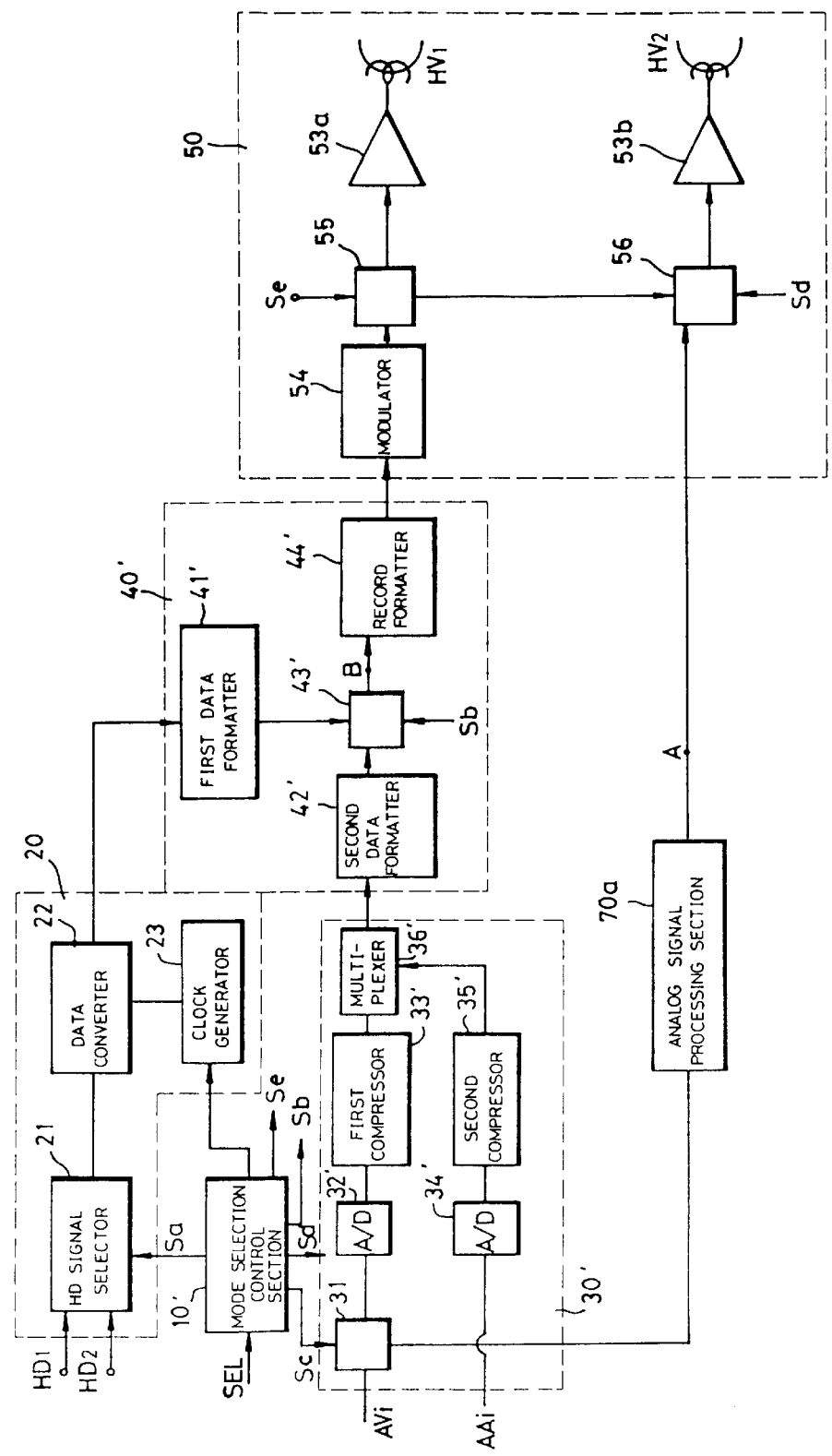
FIG. 4 is a schematic block diagram of another embodiment of the recording system according to the present invention.

FIG. 4 is a schematic block diagram showing another embodiment of the system for recording/reproducing both digital and analog signals according to the present invention. The system is provided with a mode selection control section 10' for outputting a plurality of selection control signals Sa–Se for selecting a mode corresponding to an input digital/analog mode selection signal; an HD signal selecting and converting section 20 including an HD signal selector 21 for selecting an HD signal HD1 of 20 Mbps–30 Mbps or an HD signal HD2 of 5–15 Mbps under the control of the mode selection control section 10', a clock generator 23, and a data converter 22 for processing first-in first-out the output signal of the HD signal selector 21 according to the output signal of the clock generator 23; and an A/D converting section 30' including a switch 31 for switching an analog video signal AVi according to the selection control signal Se from said mode selection control section 10", a first A/D converter 32' for converting an analog video signal outputted from said switch 31 to a digital signal, a first compressor 33' for compressing the output signal of said first A/D converter 32', a second A/D converter 34' for converting an analog audio signal AAi to a digital signal, a second compressor 35 for compressing the output signal of said second A/D converter 34', and a multiplexer 36' for multiplexing the output signals of said first and second compressors 33', 35'.

The system is also provided with a formatting section 40' including a first data formatter 41' for receiving the output signal of said data converter 22 to encode it for error correction, a second data formatter 42' for performing encoding and shift function for error correction to the output data of said multiplexer 36', a switch for selecting an output between the outputs of said first and second data formatter 41', 42' according to said selection control signal Sb, and a record formatter 44' for receiving the digital signal through said switch 43' to add thereto a sync signal and an identification signal; an analog signal processing section 70a for receiving the analog signal outputted through said switch 31 to process it to be a signal suitable for recording; and a record signal processing section 50' including a modulator 54 for modulating the output signal of said record formatter 44', a switch 55 for supplying the output signal of said modulator 54 to the first head HV1 through the first record amplifier 53a according to said selection control signal Se or for supplying it for one side input of a switch 56, and a switch 56 for selecting a signal between the output signals of said switch 55 and said analog signal processing section 70a according to said selection control signal Sd to supply it to the second head HV2 through the second record amplifier 53b.

The working effect of the record system according to the present invention constructed as above will be described in detail hereinafter.

First, regarding a process in which an RD signal HD1 of 20 Mbps–30 Mbps or an HD signal HD2 of 5–15 Mbps is selected and outputted, one of the HD signals HD1, HD2 is selected by the selection control signal Sa outputted from the mode selection control section 10', and then is supplied to the data converter 22 and processed first-in first-out according to the clock signal outputted from the clock generator 23. This outputted signal is then supplied to the first data formatter 41' for being encoded for error correction, which is supplied to one input terminal of the switch 43'.

At this time, the switch 43' selects and outputs the output signal of the first data formatter 41' by the selection control signal Sb, and this signal is supplied to the record formatter 44', to which a sync signal and an identification signal are added, and then is supplied to the modulator 54 to be modulated for a signal suitable to be recorded on the tape.

If the switch 55 is connected to the first record amplifier 53a by the selection control signal Se supplied to the switch 55, the output of the modulator 54 is recorded on the tape with a drum rotating velocity of 3600 rpm by the first head HV1 through the first record amplifier 53a as a first channel signal. Meanwhile, if the switch 55 is connected to the switch 56 and the switch 56 is connected to the second record amplifier 53b by the selection control signal Sd, the first channel signal is recorded on the tape through the second head HV2 with a drum rotating velocity of 1800 rpm.

Meanwhile, regarding a process in which an analog video signal Avi and an audio signal AAi are selected and recorded, the analog video signal AVi is selected by the switch 31 according to the selection control signal Sc, the analog video signal AVi is converted into a digital signal through the first A/D converter 32', and is then compressed through the first compressor 33'. At this time, the analog audio signal AAi is converted into a digital signal and compressed, respectively, through the second A/d converter 34' and the second compressor 35', and then is multiplexed with the output signal of the first compressor 33' by the multiplexer 36'.

The output signal of the multiplexer 36' is supplied to the second data formatter 42', and is encoded for error correction and shifted to be supplied as one input terminal of the switch 43'. At this time, the switch 43' selects the output signal of the second data formatter 42' according to the selection control signal Sb, and then the first channel signal is recorded on the tape by the first head HV1 at a speed of 3600 rpm, or through the switches 55, 56 and the second head HV2 at a speed of 1800 rpm, as described above.

Finally, in case of recording the analog video signal AVi with being not converted into a digital signal, an analog video signal AVi is inputted to the analog signal processing section 70a according to the selection control signal Sd, its outputted signal is recorded on the tape with a drum rotating velocity of 1800 rpm by the second head HV2 through the second record amplifier 53b as a first channel signal.

Figure 5:
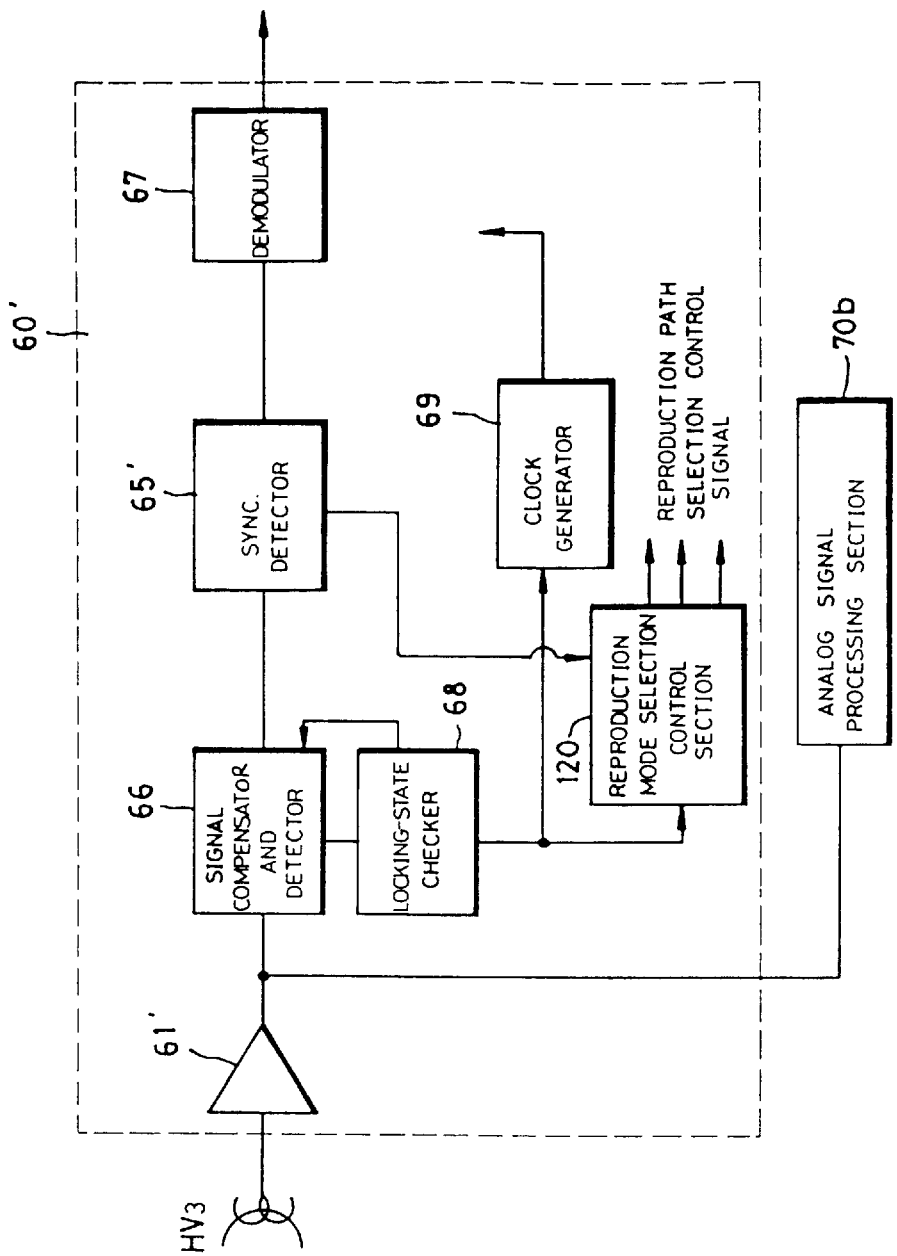
FIG. 5 is a schematic block diagram of another embodiment of the reproducing system according to the present invention.

FIG. 5 is a block diagram showing another embodiment of the reproducing system according to the present invention. The system comprises a playback signal processing section 60 comprising a playback amplifier 60' for amplifying a signal reproduced by a playback head HV3 to an appropriate level, a signal compensator and detector 66 for receiving the output signal of the playback amplifier 61' to process the frequency characteristic thereof to be flat and to detect a phase-locked loop (PLL) signal, a sync detector 65' for receiving the output signal of the compensator and detector 66, for detecting a sync signal from the received signal, and for supplying the detected signal to the demodulator 67, a locking-state checker 68 for receiving the output signal of the compensator and detector 66 to check the locking state thereof, a clock generator 69 for receiving the output signal of the locking-state checker 68 to produce a clock signal, and a reproduction mode selection control section 120 for receiving the output signal of the locking-state checker 69 to output a control signal to determine a reproducing loop.

The operation and working effect of the another embodiment of the reproducing system according to the present invention constructed as above will be described hereinafter.

A signal, which is reproduced by the reproducing head HV3 with the drum velocity of 3600 rpm, is supplied directly to the signal processing section 70b through the playback amplifier 61', and to the compensator and detector 66 to process the frequency characteristic thereof to be flat. At this time, the PLL is set based on the HD signal HD1 as a reference. The output signal of the compensator and detector 66 is supplied to the sync detector 65', by which a sync pattern is detected, and then is restored to the original signal by the demodulator 67. The restored signal then, as described in the embodiment of FIG. 1, pass through the deformatting section 80 and the D/A converting section 90 to be reproduced in an inverse order of recording.

The locking-state checker 68 checks the locking state based on the output signal of said compensator and detector 66 and transmits the result thereof to the selection control section 120. As the result of checking, if it is a locking state and the sync pattern corresponds to an HD signal HD1, the reproduction process to said HD pattern is performed, while if it is not the locking state, the reproduction process is performed with the drum velocity altered to 3600 rpm.

At this time, the clock generator 69 produces a clock based on the HD signal HD2, and selects the HD signal HD2 and the digitalized analog path according to its sync pattern.

However, in case that it is not locked and the sync pattern is not detected, an analog signal process to be performed by the analog signal processing section 70b is selected.

Figure 6:
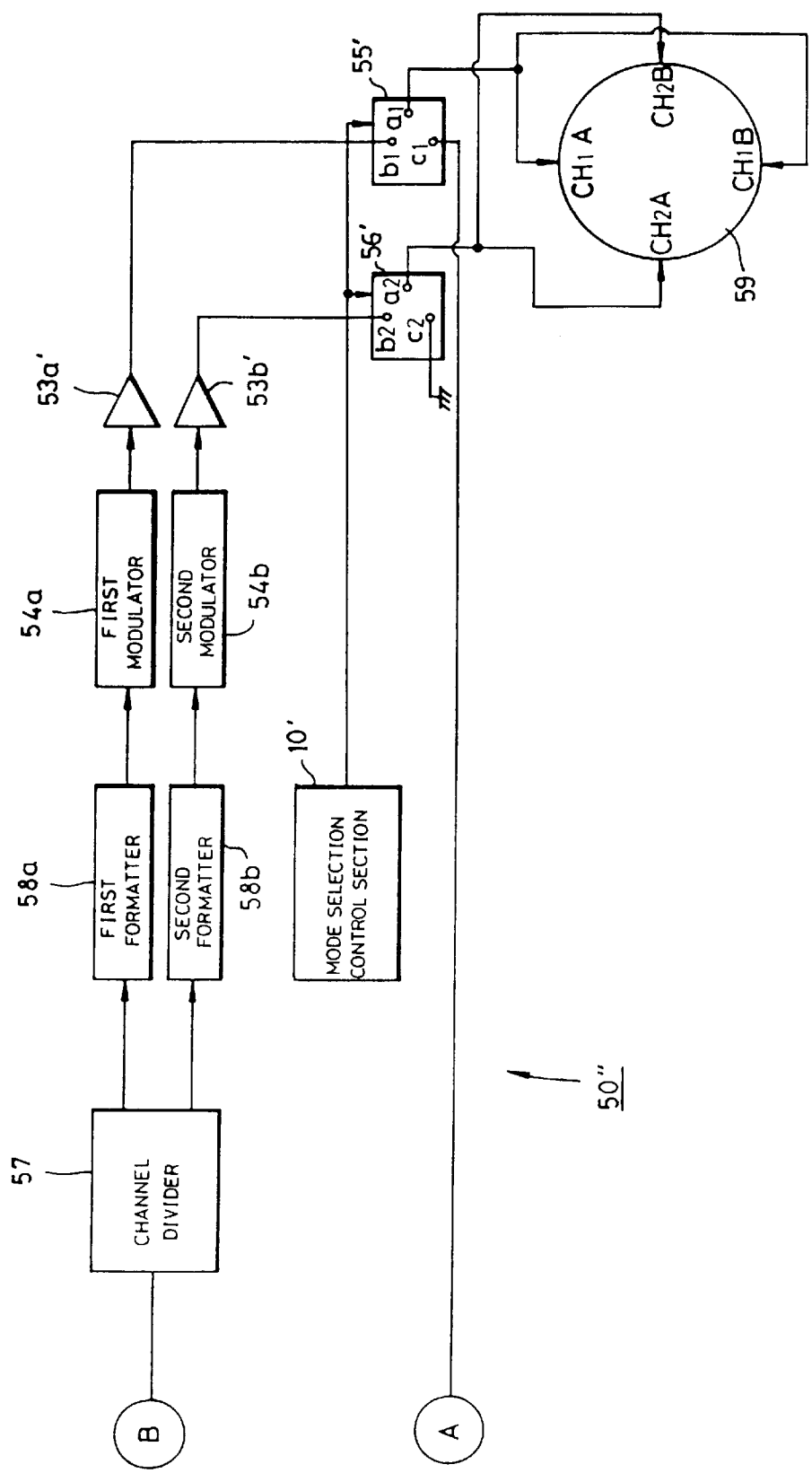
FIG. 6 is a schematic block diagram of another embodiment of the record signal processing section in FIG. 4.

Meanwhile, FIG. 6 shows another embodiment of the record signal processing section 50" for recording the two channel signals with the speed of 1800 rpm. The record signal processing section 50"0 comprises a channel divider 57 for dividing the input digital signal into two channel signals, first and second formatters 58a, 58b for adopting a specific form suitable for recording with regard to the respective channel signals CH1, CH2 outputted from the channel divider 57, first and second modulators 54a, 54b for modulating the respective signals outputted from the first and second formatter 58a, 58b to record them in a recording medium, amplifiers 53a', 54' respectively amplifying the output signals of the first and second modulators 54a, 54b to a level suitable for recording, and switches 55', 56' for selecting either the output signals of the amplifiers 53a', 53b' or the analog outputs of the analog signal processing section 70a to supply the selected signals to the heads (CH1A, CH1B), (CH2A, CH2B), respectively.

First, the recording process of an input digital signal in a recording mode will be described hereinafter. If a digital signal is inputted, it is supplied to the channel divider 57 to be divided into first and second channel signals, and the first formatter 58a formats the channel signal CH1 outputted from the channel divider 57 to supply it to the first modulator 54a. The first modulator 54a modulates the inputted signal, and the output of the first modulator 54a is amplified through the first amplifier 53d to an appropriate level, and supplied to the contact b1 of the first switch 55'. Also, the channel signal CH2 outputted from the channel divider 57 is processed as described above through the second formatter 58b, the second modulator 54b and the second amplifier 53b' in turn to be supplied to the contact of the second switch 56'.

At this time, the mode selection control section 10' outputs the selection control signal Sf to the first and second switch 55', 56' to make them to be switched to the b1, b2, respectively, the signals outputted from the first and second amplifier 53a', 53b' are supplied respectively to the heads (CH1A, CH1B), (CH2A, CH2B) through the respective contacts (b1, a1), (b2,a2) of the first and second switches 55', 56' so that the channel signals are recorded on the tape.

Meanwhile, described hereinafter will be the recording process of an input analog signal in a recording mode. An analog signal inputted through the analog signal processing section 70a is supplied to the contact c1 of the first switch 55', and then the first and second switches 55', 56, are switched to the contacts c1, c2 respectively, according to the selection control signal Sf from the mode selection control section 1O'. Therefore, the input analog signal is supplied to the heads CH1A, CH1B through the contacts c1, a1 of the switch 55' and recorded on the tape. At this time, the heads CH2A, CH2B are grounded.

In a reproducing mode, reproduction of the digital or analog signal is performed by checking the signal outputted through a processing path so as to reproduce with a drum velocity of 3600/1800 rpm with respect to one channel.

As described above, according to the present invention, not only the recording/reproducing of digital video and audio signals for HDTV but also the recording/reproducing of the conventional analog video and audio signals may be achieved, thereby the convenience in use can be provided and the high quality product achieved. Further, by varying the head drum velocity according to the type of the selected signal, there is provided an advantage that the conventional analog tape can be used in recording/reproducing digital signals.

What is claimed is:

1. A system for recording both digital and analog signals, comprising:

mode selection control means for providing a plurality of selection control signals for selecting a mode corresponding to an input digital/analog mode selection signal;

digital signal selection means for selecting one of a plurality of input HDTV digital signals under the control of said mode selection control means;

analog/digital converting means for converting input analog video and audio signals into a digital signal;

formatting means for selecting one of the outputs of said digital signal selection means and said analog/digital converting means under the control of said mode selection control means and converting the selected digital signal into a format suitable for recording on a tape;

analog signal processing means for processing said input analog video and audio signals under the control of said mode selection control means; and record signal processing means for selecting one of said digital signal from said formatting means and said analog video and audio signals from said analog signal processing means and for processing and recording on said tape the selected signal; wherein said record signal processing means comprises:

a modulator for modulating the output of said formatting means;

a first switch for switching the output of said modulator under the control of said mode selection control means;

a first record amplifier for amplifying the output of said modulator through said first switch to provide the amplified output to a first record head;

a second switch for selecting one of the output of said analog signal processing means and the output of said modulator through said first switch under the control of said mode selection control means; and a second amplifier for amplifying the output of said second switch to provide the amplified out-put to a second record head.

2. The recording system as claimed in claim 1, wherein said record signal processing means includes head drum revolution control means for controlling the revolution of a head drum to be determined different from each other under the control of said mode selection control means, whereby the head speed relative to said tape is determined different from each other depending on the selected mode.

3. The recording system as claimed in claim 1, wherein said digital signal selection means comprises:

a signal selector for selecting one of said plurality of HDTV digital signals having different bit rates from one another under the control of said mode selection control means;

a clock generator; and a data converter for processing first-in first-out the output of said signal selector in accordance with the output of said clock generator.

4. The recording system as claimed in claim 1, wherein said analog/digital converting means comprises:

first and second analog/digital converters for converting said input analog video and audio signals into digital video and audio signals, respectively;

first and second data compressors for compressing the outputs of said first and second analog/digital converters, respectively, by a predetermined bit rate suitable for recording on said tape; and a multiplexer for multiplexing the outputs of said first and second data compressors to provide said digital signal.

5. The recording system as claimed in claim 1, wherein said formatting means comprises:

a first data formatter for performing encoding for error correction with respect to said input HDTV digital signal;

a second data formatter for performing encoding for error correction with respect to said digital signal from said analog/digital converting means;

a third switch for selecting one of the outputs of said first and second data formatters under the control of said mode selection control means; and a record formatter for converting the output data through said third switch into a format suitable for recording on said tape by adding a sync signal and an identification signal thereto.

6. A system for recording both digital and analog signals, comprising:

mode selection control means for providing a plurality of selection control signals for selecting a mode corresponding to an input digital/analog mode selection signal;

digital signal selection means for selecting one of a plurality of input HDTV digital signals under the control of said mode selection control means;

analog/digital converting means for converting input analog video and audio signals into a digital signal;

formatting means for selecting one of the outputs of said digital signal selection means and said analog/digital converting means under the control of said mode selection control means and converting the selected digital signal into a format suitable for recording on a tape;

analog signal processing means for processing said input analog video and audio signals under the control of said mode selection control means; and record signal processing means for selecting one of said digital signal from said formatting means and said analog video and audio signals from said analog signal processing means and for processing and recording on said tape the selected signal, wherein said record signal processing means comprises:

a channel divider for dividing said digital signal provided from said formatting means into two channel signals;

first and second formatters for converting the respective channel signals from said channel divider into a format suitable for recording on said tape;

first and second modulators for modulating the respective channel outputs of said first and second formatters;

first and second amplifiers for amplifying the respective outputs of said first and second modulators by a predetermined level;

first and second switches for selecting either the outputs of said first and second amplifiers or the outputs of said analog signal processing means under the control of said mode selection control means; and a pair of record heads for recording on said tape the output signals selected by said first and second switches.

7. A system for reproducing both digital and analog signals, comprising:

mode selection control means for providing a plurality of selection control signals for selecting a mode corresponding to an input digital/analog mode selection signal;

playback signal processing means for dividing a playback signal reproduced by a playback head into a digital playback signal and an analog playback signal and processing the divided digital playback signal under the control of said mode selection control means;

analog signal processing means for processing said analog playback signal divided and provided by said playback signal processing means;

deformatting means for restoring said digital playback signal from said playback signal processing means to a format suitable for reproduction and selectively converting the restored signal into an HDTV digital signal or another digital signal suitable for being converted into an analog signal under the control of said mode selection control means; and digital/analog converting means for converting said another digital signal into said analog signal.

8. The reproducing system as claimed in claim 7, wherein said playback signal processing means comprises:

a playback amplifier for amplifying said playback signal reproduced by said playback head by a predetermined level;

a signal compensator and detector for performing frequency compensation with respect to the output of said playback amplifier and detecting a phase-locked-loop signal therefrom;

a sync detector for detecting a sync signal from the output of said signal compensator and detector;

a demodulator for demodulating said playback signal provided from said signal compensator and detector in accordance with said sync signal from said sync detector;

a locking-state checker for checking the locking state of the output of said signal compensator and detector;

a clock generator for generating a clock signal in response to the output of said locking-state checker; and a reproduction mode selection controller for providing control signals for determining a reproduction path in response to the output of said locking-state checker.

* * * * *